(12) United States Patent
Saripella et al.

(10) Patent No.: US 11,371,433 B2
(45) Date of Patent: Jun. 28, 2022

(54) COMPOSITE COMPONENTS HAVING PIEZOELECTRIC FIBERS

(71) Applicant: General Electric Company, Schenectady, NY (US)

(72) Inventors: Sai Venkata Karthik Saripella, Malkajgiri (IN); Nagamohan Govinahalli Prabhakar, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 16/550,721

(22) Filed: Aug. 26, 2019

(65) Prior Publication Data

US 2021/0062717 A1 Mar. 4, 2021

(51) Int. Cl.
*F02C 7/047* (2006.01)
*F01D 5/28* (2006.01)
(Continued)

(52) U.S. Cl.
CPC .............. *F02C 7/047* (2013.01); *B32B 5/02* (2013.01); *B32B 5/26* (2013.01); *B32B 38/1808* (2013.01);
(Continued)

(58) Field of Classification Search
CPC . F02C 7/047; F01D 5/14; F01D 5/147; F01D 15/10; F01D 25/02; F01D 5/282;
(Continued)

(56) References Cited

U.S. PATENT DOCUMENTS

| 5,660,877 A | 8/1997 | Venkataramani et al. |
| 6,769,873 B2 | 8/2004 | Beauchamp et al. |

(Continued)

FOREIGN PATENT DOCUMENTS

| CN | 106762146 A | 5/2017 |
| CN | 208739441 U | 4/2019 |

(Continued)

*Primary Examiner* — Eric J Zamora Alvarez
(74) *Attorney, Agent, or Firm* — Dority & Manning, P.A.

(57) ABSTRACT

Composite components and methods for forming composite components are provided. For example, a composite component of a gas turbine engine comprises a composite material, a plurality of piezoelectric fibers, and an anti-icing mechanism. The anti-icing mechanism is in operative communication with the piezoelectric fibers such that the anti-icing mechanism is activated by one or more electrical signals from the piezoelectric fibers. In exemplary embodiments, the composite component is a composite airfoil and the anti-icing mechanism is one or more heating elements. Methods for forming composite components may comprise forming piezoelectric plies comprising piezoelectric fibers embedded in a matrix material; forming reinforcing plies comprising reinforcing fibers embedded in the matrix material; laying up the piezoelectric and reinforcing plies to form a ply layup; and processing the ply layup to form the composite component. Methods including forming a piece of piezoelectric material that is adhered to a composite component also are provided.

13 Claims, 6 Drawing Sheets

(51) Int. Cl.
*F01D 5/14* (2006.01)
*F04D 29/38* (2006.01)
*B32B 5/02* (2006.01)
*B32B 5/26* (2006.01)
*B32B 38/18* (2006.01)
*B32B 3/06* (2006.01)
*B32B 5/12* (2006.01)
*B32B 7/02* (2019.01)
*B32B 19/02* (2006.01)
*B32B 19/06* (2006.01)
*B32B 3/08* (2006.01)
*B29C 70/88* (2006.01)
*F02K 3/06* (2006.01)

(52) U.S. Cl.
CPC ............... *F01D 5/14* (2013.01); *F01D 5/282* (2013.01); *F01D 5/288* (2013.01); *B32B 2307/20* (2013.01); *B32B 2603/00* (2013.01); *F05D 2220/32* (2013.01); *F05D 2230/00* (2013.01); *F05D 2260/407* (2013.01); *F05D 2300/224* (2013.01); *F05D 2300/603* (2013.01)

(58) Field of Classification Search
CPC .. F01D 5/288; F05D 2220/32; F05D 2230/00; F05D 2260/407; F05D 2300/224; F05D 2300/603; F05D 2300/6033; F05B 2220/709; B64C 2027/4736; B32B 5/02; B32B 5/26; B32B 38/1808; B32B 2307/20; B32B 2603/00
See application file for complete search history.

(56) References Cited

U.S. PATENT DOCUMENTS

| | | | |
|---|---|---|---|
| 6,986,481 B2 | 1/2006 | Fanucci et al. | |
| 7,384,240 B2 | 6/2008 | McMillan et al. | |
| 7,780,410 B2 * | 8/2010 | Kray | F01D 5/147 416/1 |
| 8,784,625 B2 * | 7/2014 | Wahl | G01N 27/4071 204/426 |
| 9,545,759 B2 | 1/2017 | Yarker et al. | |
| 9,708,929 B2 * | 7/2017 | Szwedowicz | F02C 7/047 |
| 2015/0298802 A1 | 10/2015 | Reveillon et al. | |
| 2016/0138419 A1 | 5/2016 | Kray et al. | |
| 2016/0377566 A1 * | 12/2016 | Han | H03K 3/0315 324/633 |
| 2017/0373612 A1 | 12/2017 | Sellinger et al. | |

FOREIGN PATENT DOCUMENTS

| | | |
|---|---|---|
| CN | 110053770 A | 7/2019 |
| GB | 2106966 A | 4/1983 |

* cited by examiner

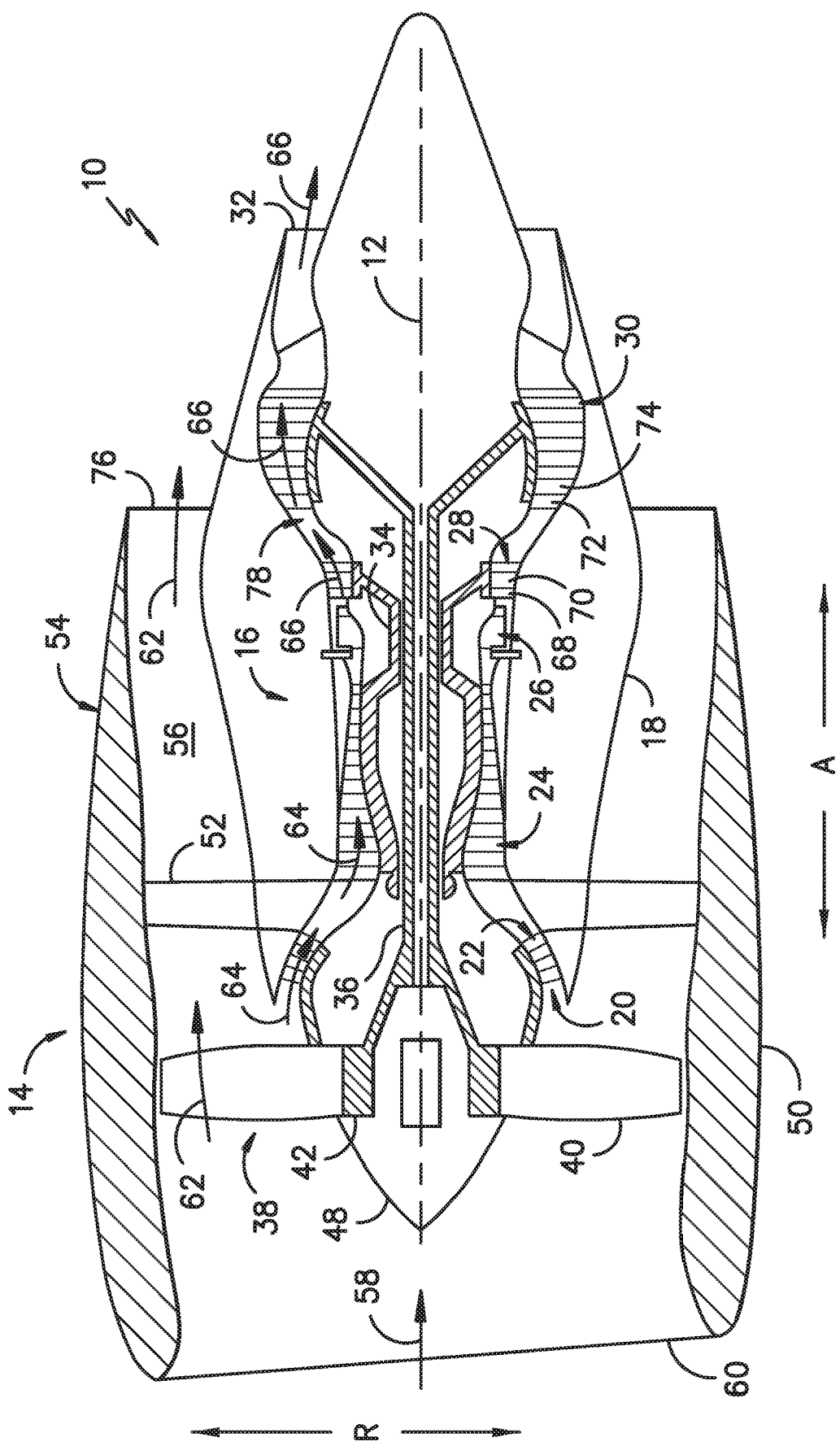
FIG. -1-

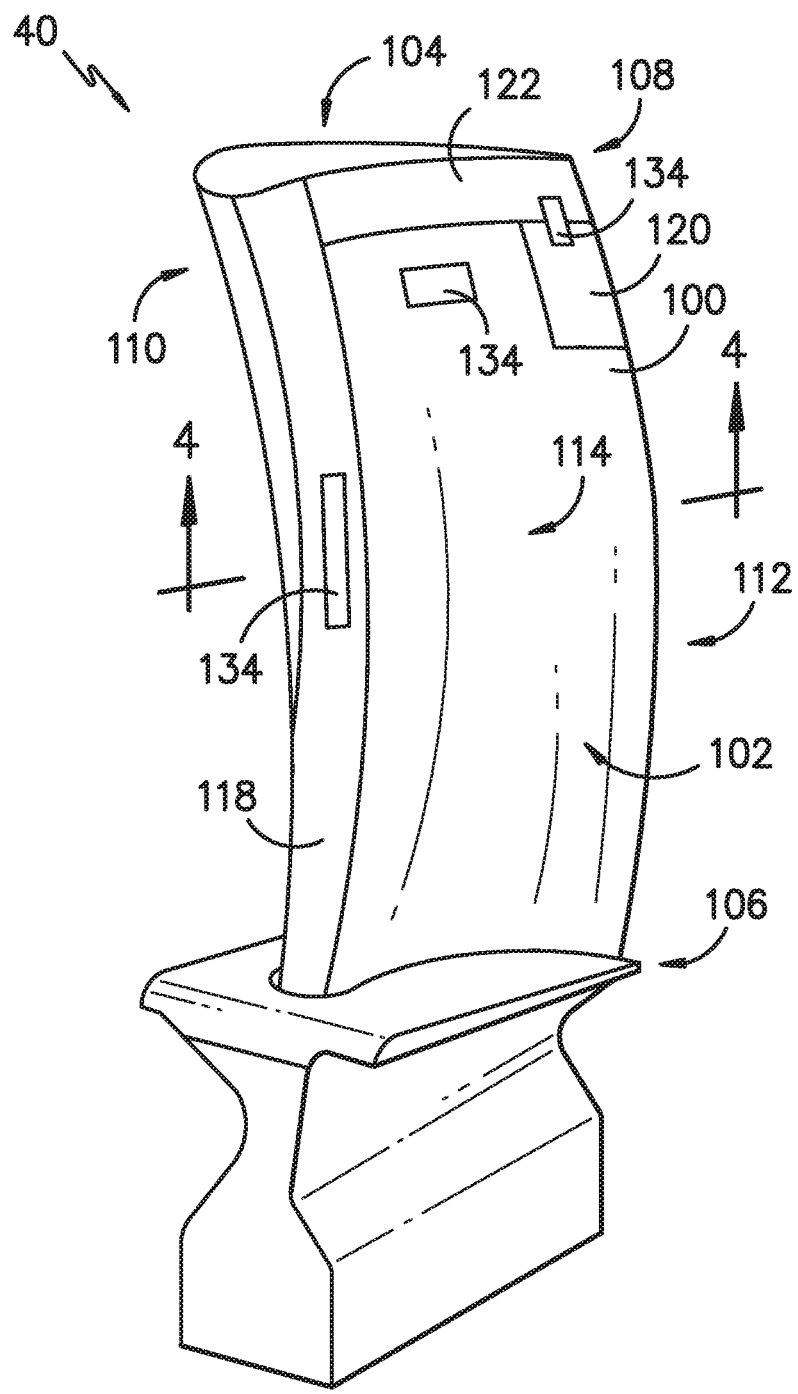
FIG. -2-

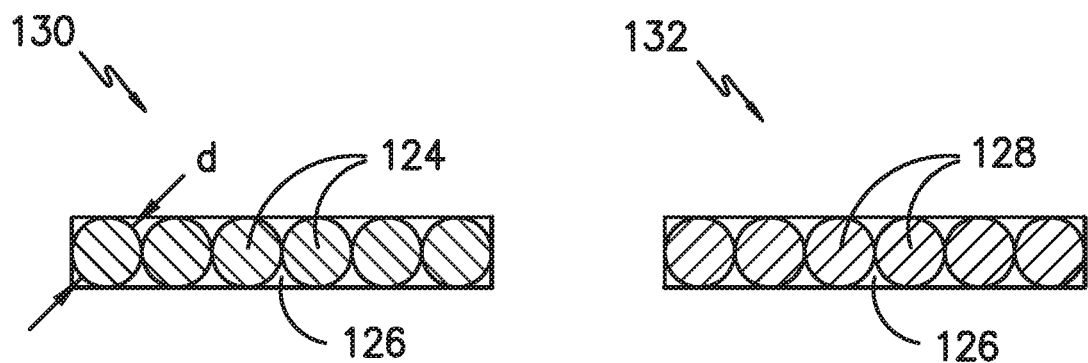
FIG. -3A-
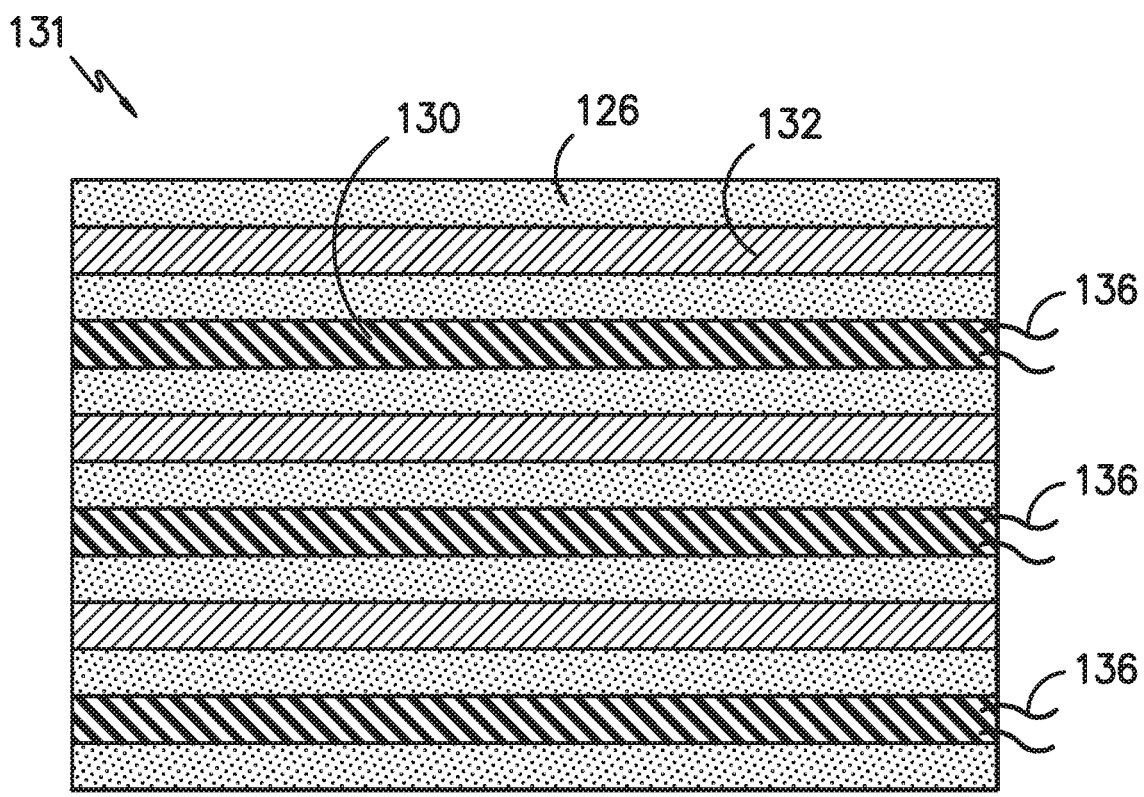
FIG. -3B-

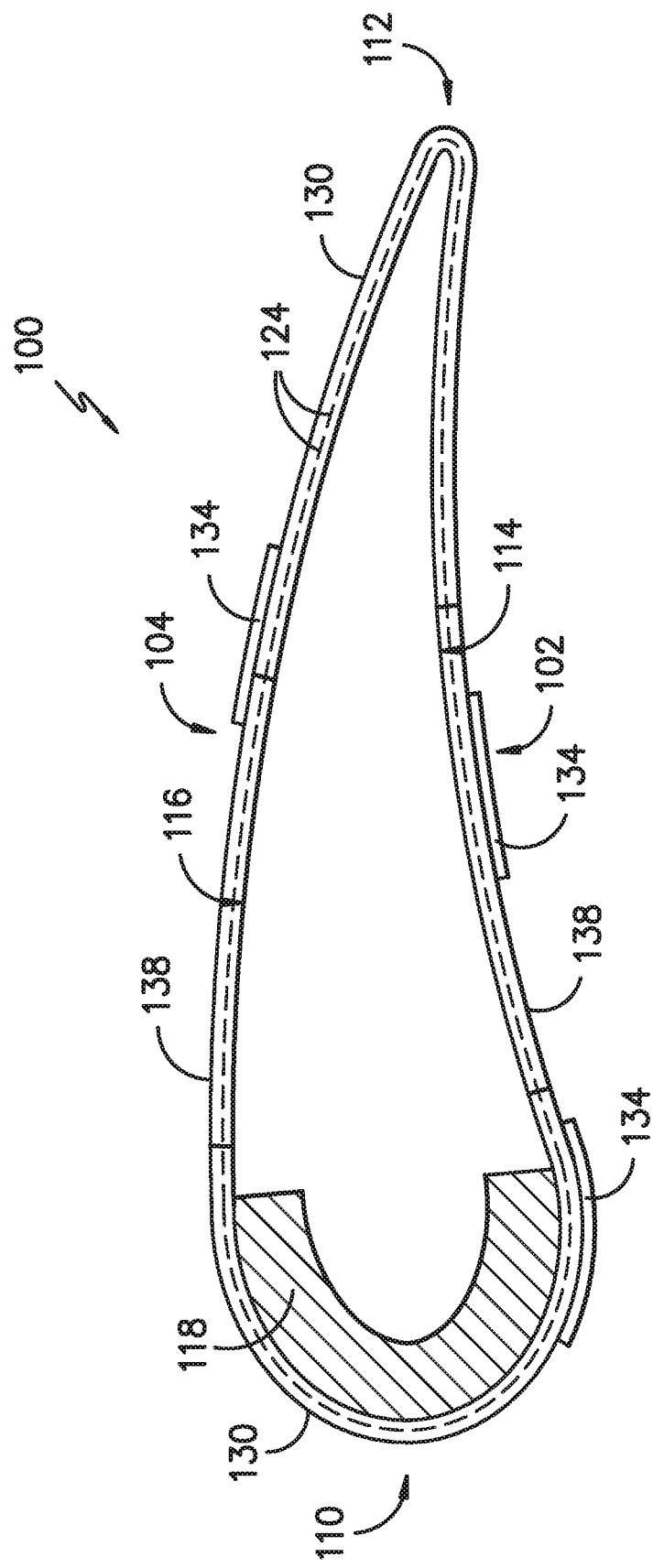
FIG. -4-

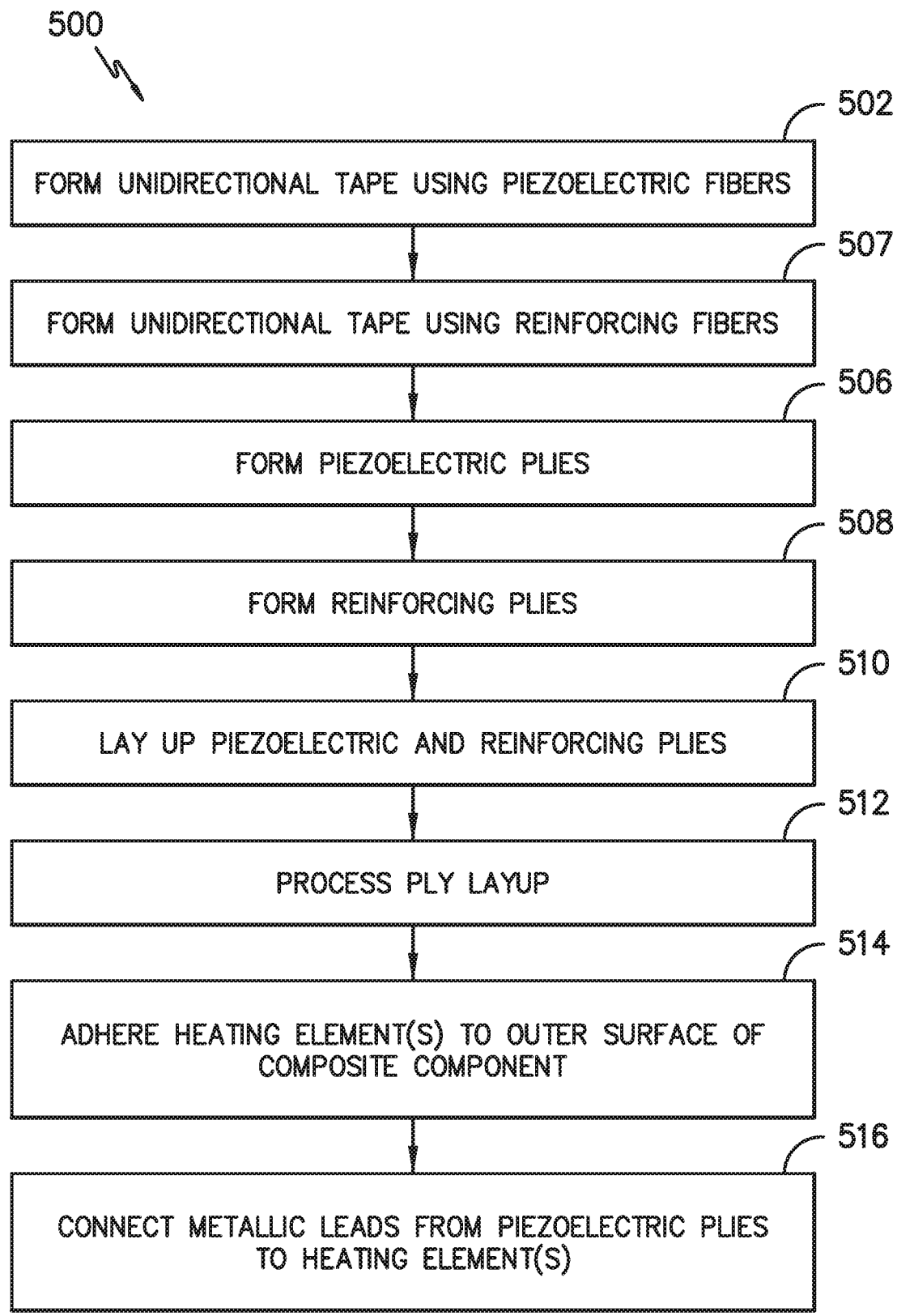
FIG. -5-

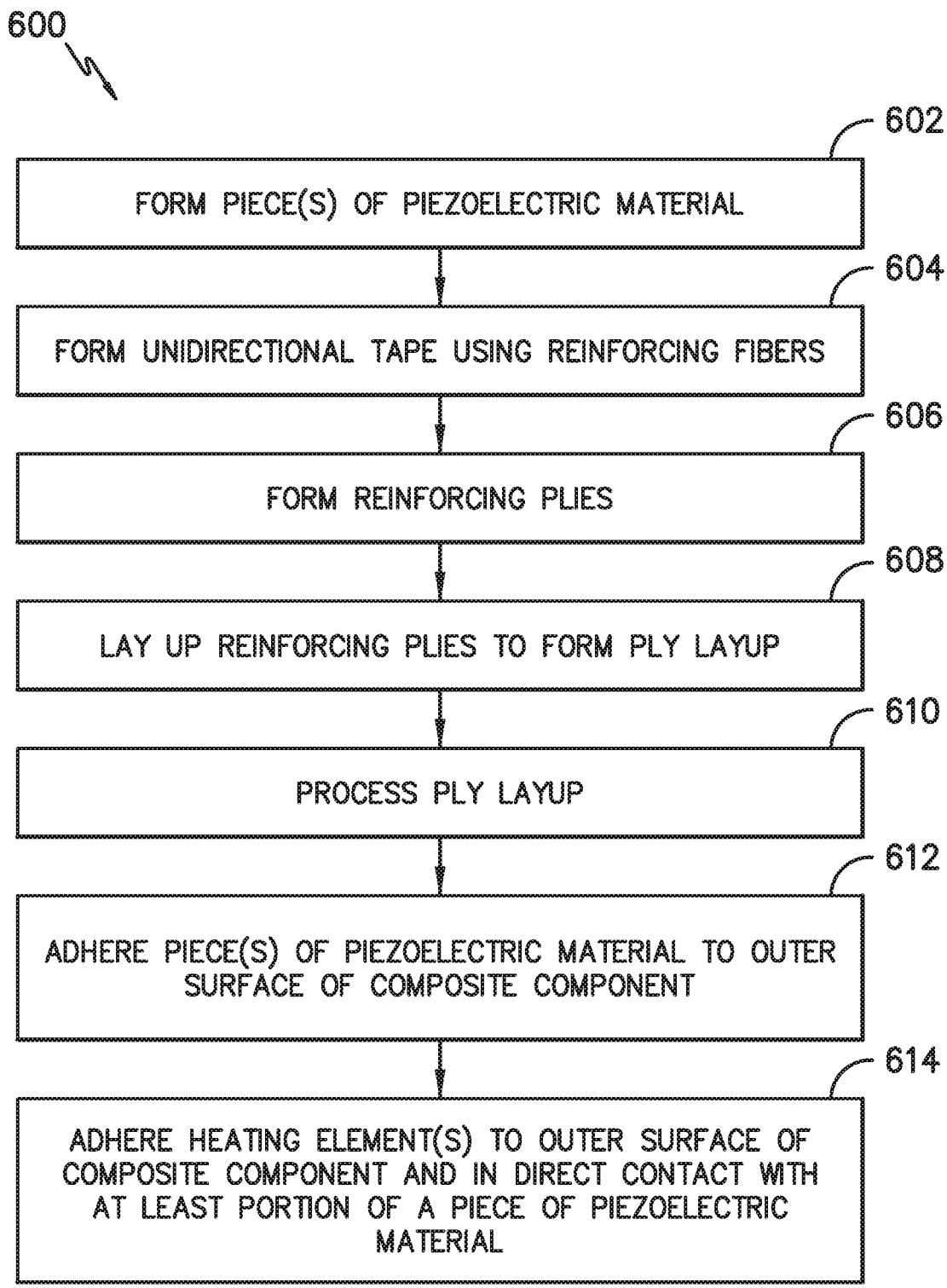
FIG. -6-

COMPOSITE COMPONENTS HAVING PIEZOELECTRIC FIBERS

FIELD

The present subject matter relates generally to composite components. More particularly, the present subject matter relates to the use of piezoelectric fibers, e.g., embedded in composite preforms or applied to the surface of composite components.

BACKGROUND

Aircraft gas turbine engines operate in various conditions and ice may form on one or more portions of the engine, such as airfoils within the engine, e.g., fan blades, inlet guide vanes, and outlet guide vanes. For instance, operating conditions such as high altitude, low temperatures, and the like may lead to ice formation on the engine. A build of ice can hamper engine performance, as well as hinder serviceability of engine components on which ice has formed. For example, engine components such as composite fan blades on which ice typically forms may have an increased number of face sheet plies to mitigate the impacts of ice formation. Thus, by preventing or reducing ice formation, the number of face sheet plies of a composite fan blade may be reduced, which reduces engine weight and, in turn, leads to fuel savings. Accordingly, improved composite components for a gas turbine engine having features for mitigating ice formation would be desirable.

BRIEF DESCRIPTION

Aspects and advantages of the invention will be set forth in part in the following description, or may be obvious from the description, or may be learned through practice of the invention.

In one exemplary embodiment of the present subject matter, a composite component of a gas turbine engine is provided. The composite component comprises a composite material, a plurality of piezoelectric fibers, and an anti-icing mechanism. The anti-icing mechanism is in operative communication with the piezoelectric fibers such that the anti-icing mechanism is activated by one or more electrical signals from the piezoelectric fibers.

In another exemplary embodiment of the present subject matter, a method for forming a composite component of a gas turbine engine is provided. The method comprises forming piezoelectric plies, each piezoelectric ply comprising piezoelectric fibers embedded in a matrix material; forming reinforcing plies, each reinforcing ply comprising reinforcing fibers embedded in the matrix material; laying up the piezoelectric plies with the reinforcing plies to form a ply layup; and processing the ply layup to form the composite component.

In a further exemplary embodiment of the present subject matter, a method for forming a composite component of a gas turbine engine is provided. The method comprises forming a piece of piezoelectric material, the piece of piezoelectric material comprising piezoelectric fibers and an adhesive; forming reinforcing plies, each reinforcing ply comprising reinforcing fibers embedded in a matrix material; laying up the reinforcing plies to form a ply layup; processing the ply layup to form the composite component; adhering the piece of piezoelectric material to an outer surface of the composite component; and adhering a heating element to the outer surface in direct contact with at least a portion of the piece of piezoelectric material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a side perspective view of a fan blade of the gas turbine engine of FIG. 1, the fan blade having a composite airfoil according to an exemplary embodiment of the present subject matter.

FIG. 3A provides a schematic cross-section view of a piezoelectric ply and a reinforcing ply of the composite airfoil of FIG. 2 according to an exemplary embodiment of the present subject matter.

FIG. 3B provides a schematic cross-section view of a ply layup of the composite airfoil of FIG. 2, utilizing piezoelectric plies and reinforcing plies as illustrated in FIG. 3A, according to an exemplary embodiment of the present subject matter.

FIG. 4 provides a cross-section view of the composite airfoil of FIG. 2, taken along the line 4-4, according to an exemplary embodiment of the present subject matter.

FIG. 5 provides a flow diagram illustrating a method for forming a composite component of a gas turbine engine casing, according to an exemplary embodiment of the present subject matter.

FIG. 6 provides a flow diagram illustrating a method for forming a composite component of a gas turbine engine casing, according to another exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Turning to FIG. 2, a composite component of a gas turbine engine, such as engine 10, will be described according to an exemplary embodiment of the present subject matter. As illustrated in the exemplary embodiment of FIG. 2, the composite component may be a composite airfoil 100 of a fan blade 40, but in other embodiments, the composite component may be another composite airfoil, such as an inlet guide vane (IGV) or an outlet guide vane (OGV) 52, or other composite component. The fan blade 40 shown in FIG. 2 includes the composite airfoil 100 having a concave pressure side 102 opposite a convex suction side 104. Opposite pressure and suction sides 102, 104 of the airfoil 100 extend radially along a span S from a root 106 to a tip 108 at the radially outermost portion of the fan blade 40. Moreover, pressure and suction sides 102, 104 of the airfoil 100 extend axially between a leading edge 110 and an opposite trailing edge 112. The leading edge 110 defines a forward end of the airfoil 100, and the trailing edge 112 defines an aft end of the airfoil 100. Further, the pressure side 102 defines an outer pressure surface 114 of the airfoil 100, and the suction side 104 defines an outer suction surface 116 (FIG. 4) of the airfoil 100. Additionally, in the depicted embodiment, a metallic leading edge segment 118 is applied over or attached to the leading edge 110, a metallic trailing edge segment 120 is applied over or attached to the trailing edge 112, and a metallic tip cap 122 is applied over or attached to the tip 108.

As will be described in greater detail with respect to FIGS. 3A, 3B, and 4, the composite airfoil 100 has piezoelectric fibers 124 either embedded in the matrix material 126 of the composite material forming the composite airfoil 100 or applied to one or more portions of the outer surface of the composite airfoil 100. A pressure load on the outer surface of the composite airfoil 100 is converted by the piezoelectric fibers 124 from mechanical energy into electrical energy, e.g., in the form of electrical signals. The pressure load may correspond to one or more engine operating conditions. A high altitude and/or very low ambient temperatures are examples of engine conditions that produce certain pressure loads on the composite component that may be used by the piezoelectric material to convert mechanical energy into electrical energy.

The electrical signals are conveyed to one or more mechanisms, e.g., to activate such mechanisms to perform a certain function. For instance, the electrical signals from the piezoelectric fibers 124 may be conveyed to one or more heating elements, which, in response to the electrical signals, are activated to generate heat. Such heat generation may, e.g., prevent or reduce ice formation on the composite component. As another example, the electrical signals from the piezoelectric fibers 124 may be conveyed to an actuator that controls variable blade vane (VBV) doors, and, in response to the electrical signals, adjusts the position of the VBV doors (e.g., such that the doors are more open or more closed compared to their previous position). Thus, the piezoelectric material may be used as an energy source for an anti-icing or de-icing mechanism, but the electrical signals from the piezoelectric material may be used for other purposes as well.

Referring particularly to FIGS. 3A and 3B, schematic cross-section views are provided of a ply layup 131 of the composite airfoil 100 according to an exemplary embodiment of the present subject matter. More particularly, FIGS. 3A and 3B illustrate an exemplary embodiment in which piezoelectric fibers are laid in the prepreg of the composite material, such as a polymer matrix composite (PMC) material, thereby forming a piezoelectric-based hybrid prepreg. More particularly, the composite material forming the composite component, such as the composite airfoil 100 in the depicted embodiment, comprises a matrix material 126 and a plurality of reinforcing fibers 128. As described herein, for PMC materials, the reinforcing fibers 128 may be carbon, glass, aromatic polyamide, and/or metal fibers, and the matrix material 126 may be a resin such as a thermoplastic resin or thermoset resin. A plurality of piezoelectric fibers 124 are embedded in the matrix material 126 such that the piezoelectric fibers 124 are embedded within the composite component 100.

In some embodiments, the piezoelectric fibers 124 may be formed into a unidirectional tape impregnated with the matrix material 126, and the tape may be cut into one or more piezoelectric plies 130. Similarly, the reinforcing fibers 128 may be formed into a unidirectional tape impregnated with the matrix material 126, and the tape may be cut into one or more reinforcing plies 132. Thus, each piezoelectric ply 130 is formed from at least a portion of the plurality of piezoelectric fibers 124 within the composite component 100, and each reinforcing ply 132 is formed from at least a portion of the plurality of reinforcing fibers 128 within the composite component 100. As described above, the matrix-impregnated plies 130, 132 may be referred to as prepreg plies.

As shown most clearly in FIG. 3B, the exemplary composite airfoil 100 comprises a plurality of piezoelectric plies 130 and a plurality of reinforcing plies 132. The piezoelectric plies 130 are alternated with the reinforcing plies 132 in the ply layup 131 to form the composite airfoil 100. In various embodiments, the composite ply layup 131 can have a varying number of piezoelectric fibers 124, which can be laid in any pattern within the composite material. For example, the piezoelectric fibers 124 may be used in selected zones or along the entire outer pressure surface 114 and/or outer suction surface 116 of the composite airfoil 100. A selected zone may be, e.g., along the leading edge 110 of the composite airfoil 100, where anti-icing or de-icing may be particularly useful, but the piezoelectric fibers 124 may be included in other selected zones as well, e.g., along the trailing edge 112, along the tip 108, and/or along the root 106, etc.

Moreover, it will be appreciated that the piezoelectric fibers 124 may vary in thickness from one composite component to another. For instance, piezoelectric fibers 124 having a first thickness or diameter d may be used for fan blade composite airfoils 100, while piezoelectric fibers 124 having a second thickness or diameter may be used for composite OGVs. The thickness or diameter of the piezoelectric fibers 124 may be the same as or different from the reinforcing fibers 128 embedded in the matrix material 126 with the piezoelectric fibers 124.

Further, the piezoelectric fibers 124 may be ceramic piezoelectric materials, polymer based, or quartz based, or any other suitable material. It will be understood that the piezoelectric material of the fibers 124 may be selected to be compatible with the reinforcing fibers 128 and matrix material 126 and, thereby, be compatible with the curing, densification, and/or other processes used to render the finished composite component. For instance, for a PMC airfoil 100, the piezoelectric fibers 124 may be polymer based for compatibility with the other constituents of the PMC material. However, any suitable piezoelectric material may be used for the fibers 124.

The piezoelectric fibers 124 incorporated into the composite component may be laid in any suitable direction. As an example, the piezoelectric fibers 124 may be laid in 0/+45/0/−45 directions. More specifically, when laying up the piezoelectric plies 130 with the reinforcing plies 132, the unidirectional piezoelectric plies 130 may be laid up such that the piezoelectric fibers 124 within the plies 130 alternate between a 0° orientation, a +45° orientation, the 0° orientation, and a −45° orientation with respect to a reference axis, such as an axial centerline of the fan case 50 where the composite component is the composite airfoil 100 of a fan blade 40. Other orientations of fibers 124 may be used as well, e.g., 0/90 directions with respect to the reference axis or other directions with respect to the reference axis.

Referring back to FIG. 2, the exemplary composite airfoil 100 also includes at least one anti-icing mechanism, such as a heating element 134 disposed on an outer surface of the airfoil 100. For example, a heating element 134 may be applied on the metallic leading edge segment 118, metallic trailing edge segment 120, metallic tip cap 122, outer pressure surface 114, and/or outer suction surface 116 of the composite airfoil 100. The heating element(s) 134 may be applied on other surfaces as well.

Each heating element 134 is in operative communication with the piezoelectric fibers 124 such that the heating element 134 is activated by one or more electrical signals from the piezoelectric fibers 124. That is, when a certain pressure load, e.g., corresponding to a particular operating condition of the gas turbine engine 10, is applied to the composite component and, thereby, the piezoelectric fibers 124, the fibers 124 convert the mechanical energy of the pressure load into electrical signals or pulses. The electrical signals or pulses are conveyed to the heating element(s) 134, which activates the heating element(s) 134 for heat generation. The heat from the heating element(s) 134 then prevents, retards, and/or reduces ice formation, e.g., in the areas at or near the heating element(s) 134.

In exemplary embodiments, a pair of metallic leads 136 connects at least a portion of the piezoelectric fibers 124 with a heating element 134, thereby placing the heating element 134 in operative communication with the fibers 124. As shown in FIG. 3B, for embodiments of the composite component comprising a plurality of piezoelectric plies 130, each piezoelectric ply 130 comprises a pair of metallic leads 136 connecting the piezoelectric fibers 124 of the piezoelectric ply 130 with a heating element 134. Of course, other suitable means for electrically connecting the piezoelectric fibers 124 and the heating element(s) 134 may be used as well.

Further, in exemplary embodiments, the heating element(s) 134 are formed from carbon nanotubes (CNT) or graphene, but the heating element(s) 134 also may be formed from other suitable materials. That is, CNT and graphene are by way of example only, and the materials for forming the heating element(s) 134 are not limited to CNT and graphene. Moreover, the heating element(s) 134 may have any suitable configuration. For example, the heating element(s) 134 may be in the form of a thermal or heating pad that may be adhered to a surface of the composite component or in the form of a thermal coating that is applied to one or more surfaces of the composite component. The heating element(s) 134, whether in the form of an adhesive pad, a coating, or other suitable form, may be selectively applied to one or more surfaces of the composite component. That is, a heating element 134 need not cover an entire surface of the component, e.g., the entire outer pressure surface 114 or the entire leading edge 110, but the heating element 134 may be selectively sized, shaped, and/or applied to cover only a portion of a surface of the component. Thus, the heating element(s) 134 also may have any suitable size or shape, which may vary from the generally rectangular shapes shown in the figures.

Turning now to FIG. 4, a cross-section view is provided of the composite airfoil 100, taken along the line 4-4 of FIG. 2, according to an exemplary embodiment of the present subject matter. More particularly, FIG. 4 illustrates an exemplary embodiment in which the piezoelectric fibers 124 are applied to the outer surface of a final, cured composite airfoil 100 (which also may be referred to as an as-is, cured composite component). That is, the piezoelectric fibers 124 shown in FIG. 4 are disposed on the outer surface of the composite airfoil 100 rather than embedded within the composite airfoil 100. The composite airfoil 100 has been processed to produce a final component, as described in greater detail herein. It will be appreciated that the final composite airfoil 100 depicted in FIG. 4 may have piezoelectric fibers 124 embedded within the airfoil's matrix material 126, such that the airfoil 100 includes piezoelectric fibers 124 within the airfoil 100 and along its outer surface, or may be composed of only reinforcing fibers 128 and matrix material 126 that has been cured or otherwise processed to form a final composite component, such that piezoelectric fibers 124 are included only along the outer surface of the airfoil 100.

As depicted in FIG. 4 and described herein, the composite airfoil 100 has a plurality of outer surfaces, e.g., the outer pressure surface 114, outer suction surface 116, metallic leading edge segment 118, etc. When applied to the outer surface of the composite component, as shown in FIG. 4, the piezoelectric fibers 124 are applied to at least one outer surface of the plurality of outer surfaces 114, 116, 118, 120, 122, etc. In some embodiments, the piezoelectric fibers 124 are formed into a piece 138 of piezoelectric material, e.g., comprising the piezoelectric fibers 124 and an adhesive, and the piece 138 of piezoelectric material is adhered to the at least one outer surface of the composite component 100. For example, one piece 138 of piezoelectric material (comprising the piezoelectric fibers 124) is applied on the pressure side 102 or the suction side 104 of the composite airfoil 100 of the fan blade 40. Alternatively, a piece 138 of piezoelectric material is applied on both the pressure and suction sides 102, 104, e.g., one piece 138 may wrap around the airfoil 100 to be applied on both pressure and suction sides 102, 104 or two or more pieces 138 may be applied to the outer surface of the airfoil 100 such that at least one piece 138 is applied to the pressure side 102 and at least one piece 138 is applied to the suction side 104. In some embodiments, the pieces 138 are strips of piezoelectric material that may be cut into any size or shape.

Like the embodiment in which the piezoelectric fibers 124 are embedded within the composite component, the piezoelectric fibers 124 applied to the outer surface of the composite component (e.g., via piece(s) 138 of piezoelectric material) are in operative communication with one or more heating elements 134. However, unlike the embedded piezoelectric fibers 124, which require metallic leads 136 or the like to connect the piezoelectric fibers 124 to the heating element(s) 134, the heating element(s) 134 in operative communication with the surface piezoelectric fibers 124 may be in direct contact with the surface piezoelectric fibers 124. For instance, each heating element 134 may be applied on top of at least a portion of a piece 138 of the piezoelectric material, such that the heating element 134 is in direct contact with the piezoelectric fibers 124 of the piece 138 of piezoelectric material. In some embodiments, a heating element 134 may be in direct contact with both the piezoelectric fibers 124 and a metallic segment attached to the composite component. As one example, the heating element 134 may be in direct contact with both the piezoelectric fibers 124 and the metallic leading edge segment 118. As such, the heat generated by the heating element 134 when the heating element 134 receives the electrical signals or pulses from the piezoelectric fibers 124 may be transferred along the metallic leading edge segment 118 to prevent or reduce ice formation along the leading edge 110 of the airfoil 100. Alternatively or additionally, one or more heating elements 134 may be applied on the outer pressure surface 114 and/or the outer suction surface 116, and in direct contact with at least a portion of the piezoelectric fibers 124 disposed along an outer surface of the composite component, to apply heat to the pressure and/or suction sides 102, 104 when the heating element(s) 134 generate heat in response to electrical signals or pulses from the piezoelectric fibers 124. It will be appreciated that the heating element(s) 134 may be formed from any suitable material, in any suitable configuration, and in any suitable shape, examples of which are described in greater detail elsewhere herein.

As previously stated, some exemplary embodiments of the present subject matter incorporate both embedded piezoelectric fibers 124 and surface applied piezoelectric fibers 124. In such embodiments, the composite component may comprise a plurality of piezoelectric fibers 124 and a plurality of outer surfaces, e.g., outer pressure surface 114, outer suction surface 116, leading edge 110, trailing edge 112, tip 108, and root 106. A first portion of the piezoelectric fibers 124 are applied to at least one outer surface of the plurality of outer surfaces. Further, the composite material forming the composite component comprises a second portion of the piezoelectric fibers 124 and a plurality of reinforcing fibers 128 embedded in a matrix material 126. Accordingly, the piezoelectric fibers 124 are both embedded within the composite component and applied to at least one outer surface of the composite component. As described herein, the composite component may be a composite airfoil 100 of a fan blade 40, an IGV, an OGV 52, or other composite component of a gas turbine engine 10.

Moreover, the electrical signals generated by the piezoelectric fibers 124 in response to an engine operating condition may be used to activate other mechanisms or components in addition to or as an alternative to a heating element 134. As one example, the piezoelectric fibers 124 may be in operative communication with an actuator that controls one or more variable blade vane (VBV) doors. As such, the electrical signals from the piezoelectric fibers 124 may be transmitted to the actuator to control the opening or closing of the VBV door(s). For instance, in response to electrical signals from the piezoelectric fibers 124, the actuator may reposition a VBV door to a more open position than a previous position or to a more closed position than the previous position. The electrical signals from the piezoelectric fibers 124 may be used in other ways as well, e.g., to activate other mechanisms that should undergo a change in state in response to a given engine operating condition.

Turning now to FIG. 5, a flow diagram is provided illustrating an exemplary method 500 for a composite component of a gas turbine engine, such as a composite airfoil 100. As shown at 502 and 504 of FIG. 5, the method 500 includes forming unidirectional tapes of piezoelectric fibers 124 impregnated with matrix material 126 and reinforcing fibers 128 impregnated with matrix material 126. Then, as illustrated at 506 and 508, the tapes are cut into piezoelectric plies 130 and reinforcing plies 132, which are laid up in a ply layup 131 as shown at 510. The piezoelectric plies 130 and reinforcing plies 132 may be alternated as described herein, and the plies 130, 132 may be laid up in any suitable direction. In one exemplary embodiment, the piezoelectric plies 130 are laid up with the reinforcing plies 132 such that the piezoelectric plies 130 are oriented in the 0/−45/0/+45 directions (with respect to a reference direction, such as the centerline axis of the fan case 50 where the composite component is a composite airfoil 100 of a fan blade 40). Further, each piezoelectric ply 130 comprises a pair of metallic leads 136 extending therefrom for connecting to a heating element 134 as described herein.

Next, as shown at 512 in FIG. 5, the ply layup 131 undergoes thermal and/or chemical processing to form the composite component 100. For example, for a PMC airfoil 100, the composite ply layup 131 is debulked and consolidated, e.g., at elevated temperatures and pressures in an autoclave, and undergoes densification and final curing. For a CMC airfoil 100, the composite ply layup 131 is debulked and, if appropriate, cured while subjected to elevated pressures and temperatures to produce a cured preform, e.g., the layup or preform may be cured in an autoclave to form an autoclaved body. In exemplary embodiments, the autoclaved body is then heated (fired) in a vacuum or inert atmosphere to decompose the binders, remove the solvents, and convert the precursor to the desired ceramic matrix material. Due to decomposition of the binders, the result for the preform is a porous CMC fired body that may undergo densification, e.g., melt infiltration (MI), to fill the porosity and yield the respective CMC component. Specific processing techniques and parameters for the thermal and/or chemical processing of the ply layup 131 will depend on the particular composition of the materials. As an example, other known methods or techniques for curing composite plies, as well as for densifying a CMC component, may be utilized. Further, processing the ply layup 131 also may include applying one or more metallic segments to the composite component, e.g., a metallic leading edge segment 118, a metallic trailing edge segment 120, and/or a metallic tip cap 122 may be applied or attached to a composite airfoil 100.

After processing the ply layup 131 to form the composite component 100, one or more heating elements 134 may be adhered to the outer surface of the composite component 100, as illustrated at 514 in FIG. 5. For instance, as described herein, a heating element 134 may be applied on the metallic leading edge segment 118, where the composite component is a composite airfoil 100 including a metallic leading edge segment 118, and/or may be applied on one or both of the outer pressure surface 114 and outer suction surface 116 of the composite airfoil 100. Then, as shown at 516 in FIG. 5, the pair of metallic leads 136 from each piezoelectric ply 130 is connected to a heating element 134 to place the heating element 134 in operative communication with at least a portion of the piezoelectric fibers 124. Once in operative communication, the electrical signals from the piezoelectric fibers 124 can be transmitted to the heating element 134 to activate the heating element for the generation of heat, e.g., to prevent or reduce ice formation along one or more surfaces of the composite component 100.

Referring to FIG. 6, a flow diagram is provided illustrating another exemplary method 600 for a composite component of a gas turbine engine, such as a composite airfoil 100. As shown at 602 in FIG. 6, the method 600 includes forming one or more pieces 138 of a piezoelectric material, each piece 138 comprising a plurality of piezoelectric fibers 124 and, e.g., an adhesive or other binder. The method 600 also includes forming a unidirectional tape of reinforcing fibers 128 impregnated with matrix material 126, as shown at 604. Then, as illustrated at 606 and 608, the reinforcing tape is cut into reinforcing plies 132 that are laid up in a ply layup. The reinforcing plies 132 may be laid up in any suitable direction, e.g., the 0/90 directions, the −45/+45 directions, the 0/−45/0/+45 directions, etc., where each direction is determined with respect to a reference direction, such as the centerline axis of the fan case 50 where the composite component is a composite airfoil 100 of a fan blade 40.

Next, as shown at 610 in FIG. 6, the ply layup of reinforcing plies undergoes thermal and/or chemical processing to form the composite component 100, which, unlike the component 100 formed from the method 500, does not include piezoelectric fibers embedded within the component 100. For example, for a PMC airfoil 100, the composite ply layup is debulked and consolidated, e.g., at elevated temperatures and pressures in an autoclave, and undergoes densification and final curing. For a CMC airfoil 100, the composite ply layup is debulked and, if appropriate, cured while subjected to elevated pressures and temperatures to produce a cured preform, e.g., the layup or preform may be cured in an autoclave to form an autoclaved body. In exemplary embodiments, the autoclaved body is then heated (fired) in a vacuum or inert atmosphere to decompose the binders, remove the solvents, and convert the precursor to the desired ceramic matrix material. Due to decomposition of the binders, the result for the preform is a porous CMC fired body that may undergo densification, e.g., melt infiltration (MI), to fill the porosity and yield the respective CMC component. Specific processing techniques and parameters for the thermal and/or chemical processing of the ply layup will depend on the particular composition of the materials. As an example, other known methods or techniques for curing composite plies, as well as for densifying a CMC component, may be utilized. Further, processing the ply layup also may include applying one or more metallic segments to the composite component, e.g., a metallic leading edge segment 118, a metallic trailing edge segment 120, and/or a metallic tip cap 122 may be applied or attached to a composite airfoil 100.

After processing the ply layup to form the composite component 100, one or more pieces 138 of the piezoelectric material are adhered to the outer surface of the composite component 100, as illustrated at 612 in FIG. 6. Then, as shown at 614, one or more heating elements 134 may be adhered to the outer surface of the composite component. For instance, as described herein, a heating element 134 may be applied on the metallic leading edge segment 118, where the composite component is a composite airfoil 100 including a metallic leading edge segment 118, and/or may be applied on one or both of the outer pressure surface 114 and outer suction surface 116 of the composite airfoil 100. As previously described, each heating element 134 also is adhered to the composite component in direct contact with at least a portion of a piece 138 of piezoelectric material, such that the heating element 134 is in direct contact with at least a portion of the piezoelectric fibers 124 applied to the outer surface of the composite component. In this way, the electrical signals from the piezoelectric fibers 124 are transmitted to the heating element 134 to activate the heating element for the generation of heat, e.g., to prevent or reduce ice formation along one or more surfaces of the composite component 100.

It will be appreciated that the method 500 and method 600 may be combined to produce a composite component in which piezoelectric fibers 124 are both embedded within the composite component and applied to the outer surface of the component as described herein. Further, it will be understood that some portions of each method 500, 600 may be performed simultaneously or in a different order. For example, the unidirectional tapes comprising piezoelectric fibers 124 and reinforcing fibers 128 may be formed simultaneously, although shown as separate steps in the method 500. As another example, the pieces 138 of piezoelectric material may be formed while the composite component 100 is being formed, rather than before the composite component is formed as illustrated in method 600.

Accordingly, as described herein, the present subject matter provides a mechanism for translating an operating condition of a gas turbine engine into one or more signals for controlling or actuating components of the gas turbine engine. As an example, the present subject matter provides assemblies, systems, and methods for translating an engine operating condition into electrical signals used to actuate heat generation to prevent or reduce ice formation on a component of the gas turbine engine. As described herein, a composite component of the gas turbine engine comprises a piezoelectric material that converts pressure on the component, which corresponds to an engine operating condition, to electrical signals that are transmitted to a heating element to activate the heating element for heat generation, e.g., for anti-icing or de-icing of the composite component. More particularly, the piezoelectric mechanism can be activated under certain loading conditions such as ice formation, which occurs during certain engine operating conditions such as high altitude or very low ambient temperatures. That is, a different pressure load occurs under certain operating conditions, which can activate the piezoelectric mechanism. The piezoelectric mechanism can be used as a means to generate electrical signals which can be transmitted to other components for other mechanisms such as anti-icing applications, opening/closing variable blade vane (VBV) doors, etc. The electrical signals can be transmitted via, e.g., metal leads where piezoelectric fibers are sandwiched or embedded within the composite material of the composite component or direct contact where the piezoelectric fibers are applied to the surface of the composite component. For instance, the piezoelectric fibers can be disposed within the composite component and/or applied to the outer surface of the composite component in zones or areas particularly prone to icing. As such, the piezoelectric material, placed in operative communication with one or more heating elements, may reduce the formation of ice on the composite component because of the anti-icing mechanism, i.e., heat generation, activated by the piezoelectric material. Anti-icing may help increase the serviceability of the face sheet and acoustic panels, as the face sheet and acoustic panels will have less ice formed thereon. Further, by reducing the possibility for ice formation, the number of face sheet plies forming the composite component may be reduced, which, in turn, leads to a reduction in engine weight, with corresponding fuel savings. Other advantages of the subject matter described herein also may be realized by those of ordinary skill in the art.

Further aspects of the invention are provided by the subject matter of the following clauses:

1. A composite component of a gas turbine engine, comprising a composite material, piezoelectric fibers, and an anti-icing mechanism, wherein the anti-icing mechanism is in operative communication with the piezoelectric fibers such that the anti-icing mechanism is activated by one or more electrical signals from the piezoelectric fibers.

2. The composite component of any preceding claim, wherein the composite material comprises a matrix material and wherein the piezoelectric fibers are embedded in the matrix material such that the piezoelectric fibers are embedded within the composite component.

3. The composite component of any preceding claim, wherein the composite component comprises a piezoelectric ply formed from at least a portion of the piezoelectric fibers impregnated with the matrix material and a reinforcing ply formed from reinforcing fibers impregnated with the matrix material.

4. The composite component of any preceding claim, further comprising a plurality of the piezoelectric plies and a plurality of the reinforcing plies.

5. The composite component of any preceding claim, wherein the plurality of piezoelectric plies are alternated with the plurality of reinforcing plies in a ply layup to form the composite component.

6. The composite component of any preceding claim, wherein the anti-icing mechanism is a heating element and wherein each piezoelectric ply of the plurality of piezoelectric plies comprises a pair of metallic leads connecting the piezoelectric fibers of the piezoelectric ply with the heating element.

7. The composite component of any preceding claim, further comprising a pair of metallic leads connecting at least a portion of the piezoelectric fibers with the anti-icing mechanism.

8. The composite component of any preceding claim, wherein the composite material comprises a plurality of reinforcing fibers embedded in a matrix material and wherein the composite material is cured to form the composite component.

9. The composite component of any preceding claim, further comprising a plurality of outer surfaces, wherein the piezoelectric fibers are applied to at least one outer surface of the plurality of outer surfaces.

10. The composite component of any preceding claim, wherein the piezoelectric fibers are formed into a piece of piezoelectric material and wherein the piece of piezoelectric material is adhered to the at least one outer surface.

11. The composite component of any preceding claim, wherein the anti-icing mechanism is a heating element and wherein the heating element is in direct contact with the piezoelectric fibers.

12. The composite component of any preceding claim, further comprising a metallic segment attached to an outer surface, wherein the anti-icing mechanism is a heating element and wherein the heating element is applied to the metallic segment.

13. The composite component of any preceding claim, wherein the anti-icing mechanism is a heating element and wherein the heating element is formed from carbon nanotubes.

14. The composite component of any preceding claim, wherein the anti-icing mechanism is a heating element and wherein the heating element is formed from graphene.

15. The composite component of any preceding claim, further comprising a plurality of outer surfaces, wherein a first portion of the piezoelectric fibers are applied to at least one outer surface of the plurality of outer surfaces and wherein the composite material comprises a second portion of the piezoelectric fibers and a plurality of reinforcing fibers embedded in a matrix material such that the piezoelectric fibers are both embedded within the composite component and applied to at least one outer surface of the composite component.

16. The composite component of any preceding claim, wherein the composite component is a composite airfoil, the composite airfoil comprising opposite pressure and suction sides extending radially along a span and opposite leading and trailing edges extending radially along the span, the pressure and suction sides extending axially between the leading and trailing edges, and wherein the anti-icing mechanism is one or more heating elements disposed on an outer surface of the composite airfoil.

17. The composite component of any preceding claim, wherein the composite airfoil is a fan blade and further comprises a metallic leading edge segment applied over the leading edge; a metallic trailing edge segment applied over the trailing edge; a metallic tip cap applied over a tip of the fan blade, the tip being the radially outermost portion of the fan blade, wherein the pressure side defines an outer pressure surface and the suction side defines an outer suction surface, wherein a heating element of the one or more heating elements is applied to at least one of the metallic leading edge segment, metallic trailing edge segment, metallic tip cap, outer pressure surface, or outer suction surface.

18. A method for forming a composite component of a gas turbine engine, the method comprising forming piezoelectric plies, each piezoelectric ply comprising piezoelectric fibers embedded in a matrix material; forming reinforcing plies, each reinforcing ply comprising reinforcing fibers embedded in the matrix material; laying up the piezoelectric plies with the reinforcing plies to form a ply layup; and processing the ply layup to form the composite component.

19. The method of any preceding claim, further comprising forming a unidirectional tape using the piezoelectric fibers prior to forming piezoelectric plies.

20. The method of any preceding claim, further comprising forming a unidirectional tape using the reinforcing fibers prior to forming reinforcing plies.

21. The method of any preceding claim, further comprising adhering a heating element to an outer surface of the composite component, the heating element in operative communication with the piezoelectric fibers.

22. The method of any preceding claim, further comprising connecting metallic leads from the piezoelectric plies to a heating element.

23. A method for forming a composite component of a gas turbine engine, the method comprising forming a piece of piezoelectric material, the piece of piezoelectric material comprising piezoelectric fibers and an adhesive; forming reinforcing plies, each reinforcing ply comprising reinforcing fibers embedded in a matrix material; laying up the reinforcing plies to form a ply layup; processing the ply layup to form the composite component; adhering the piece of piezoelectric material to an outer surface of the composite component; and adhering a heating element to the outer surface in direct contact with at least a portion of the piece of piezoelectric material.

24. The method of any preceding claim, further comprising forming a unidirectional tape using the reinforcing fibers prior to forming reinforcing plies.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A composite component of a gas turbine engine, comprising:
    a composite material;
    piezoelectric fibers;
    an outer surface; and
    an anti-icing mechanism,
    wherein the anti-icing mechanism is in operative communication with the piezoelectric fibers such that the anti-icing mechanism is activated by one or more electrical signals from the piezoelectric fibers,
    wherein at least a first portion of the piezoelectric fibers are formed into a piece of piezoelectric material,
    wherein the piece of piezoelectric material is adhered to the outer surface, and
    wherein the anti-icing mechanism is a heating element applied on top of at least a portion of the piece of piezoelectric material such that the heating element is in direct contact with the at least a portion of the piece of piezoelectric material.

2. The composite component of claim 1, wherein the composite material comprises a matrix material, and
    wherein a second portion of the piezoelectric fibers are embedded in the matrix material such that the second portion of the piezoelectric fibers are embedded within the composite component.

3. The composite component of claim 1, wherein the composite component comprises a piezoelectric ply formed from a second portion of the piezoelectric fibers impregnated with a matrix material and a reinforcing ply formed from reinforcing fibers impregnated with the matrix material.

4. The composite component of claim 3, further comprising:
    a plurality of the piezoelectric plies; and
    a plurality of the reinforcing plies.

5. The composite component of claim 4, wherein the plurality of piezoelectric plies are alternated with the plurality of reinforcing plies in a ply layup to form the composite component.

6. The composite component of claim 4, wherein each piezoelectric ply of the plurality of piezoelectric plies comprises a pair of metallic leads connecting piezoelectric fibers of the piezoelectric ply with the heating element.

7. The composite component of claim 1, wherein the heating element is a plurality of heating elements, and further comprising:
    a pair of metallic leads connecting at least a second portion of the piezoelectric fibers with at least one heating element of the plurality of heating elements.

8. The composite component of claim 1, wherein the composite material comprises a plurality of reinforcing fibers embedded in a matrix material, and
    wherein the composite material is cured to form the composite component.

9. The composite component of claim 1, further comprising:
    a metallic segment attached to the outer surface,
    wherein the heating element is applied to the metallic segment.

10. The composite component of claim 1,
    wherein the heating element is formed from carbon nanotubes.

11. The composite component of claim 1,
    wherein the heating element is formed from graphene.

12. The composite component of claim 1, wherein the composite component is a composite airfoil, the composite airfoil comprising:
    opposite pressure and suction sides extending radially along a span, and opposite leading and trailing edges extending radially along the span, the pressure and suction sides extending axially between the leading and trailing edges.

13. The composite component of claim 12, wherein the composite airfoil is a fan blade and further comprises:
a metallic leading edge segment applied over the leading edge;
a metallic trailing edge segment applied over the trailing edge;
a metallic tip cap applied over a tip of the fan blade, the tip being the radially outermost portion of the fan blade,
wherein the pressure side defines an outer pressure surface and the suction side defines an outer suction surface,
wherein the heating element is applied to at least one of the metallic leading edge segment, metallic trailing edge segment, metallic tip cap, outer pressure surface, or outer suction surface.

\* \* \* \* \*